United States Patent
Chen et al.

(10) Patent No.: US 9,638,797 B2
(45) Date of Patent: May 2, 2017

(54) MONITORING DEVICE

(71) Applicant: SYNCMOLD ENTERPRISE CORP., New Taipei (TW)

(72) Inventors: Shih-Fu Chen, New Taipei (TW); Shu-Wei Yang, New Taipei (TW); Ta-Sen Wei, Changhua (TW); Peng-Ta Liu, Changhua (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 0 days.

(21) Appl. No.: 14/930,986

(22) Filed: Nov. 3, 2015

(65) Prior Publication Data

US 2016/0291152 A1    Oct. 6, 2016

(30) Foreign Application Priority Data

Mar. 31, 2015   (TW) .............................. 104204808 U

(51) Int. Cl.
| | |
|---|---|
| *G01S 15/00* | (2006.01) |
| *G01S 15/04* | (2006.01) |
| *G01S 17/02* | (2006.01) |
| *G08B 21/22* | (2006.01) |
| *G01S 17/50* | (2006.01) |
| *G01S 17/88* | (2006.01) |
| *G01S 15/52* | (2006.01) |
| *G01S 15/87* | (2006.01) |

(52) U.S. Cl.
CPC .............. *G01S 15/04* (2013.01); *G01S 15/52* (2013.01); *G01S 15/87* (2013.01); *G01S 17/026* (2013.01); *G01S 17/50* (2013.01); *G01S 17/88* (2013.01); *G08B 21/22* (2013.01)

(58) Field of Classification Search
CPC ........ G01S 15/04; G01S 17/026; G01S 15/52; G01S 15/87; G01S 17/50; G01S 17/88; G08B 21/22; G08B 21/0446; G08B 21/0461; A61B 5/1115
USPC ..... 340/286.07, 573.4, 573.1, 555–557, 600; 367/93; 250/338.1
See application file for complete search history.

(56) References Cited

U.S. PATENT DOCUMENTS

| | | | |
|---|---|---|---|
| 4,196,425 A | | 4/1980 | Willimas, Jr. et al. |
| 5,600,305 A | * | 2/1997 | Stafford ............... A61B 5/1104 340/556 |
| 6,702,745 B1 | * | 3/2004 | Smythe ............... G01S 15/8993 600/443 |
| 9,098,993 B2 | * | 8/2015 | Reed, Jr. ............... A61B 5/6889 |
| 2011/0278459 A1 | * | 11/2011 | Hohl ........................ G08B 3/10 250/340 |

(Continued)

FOREIGN PATENT DOCUMENTS

WO    WO 2009 029996    3/2009

*Primary Examiner* — Anh V La
(74) *Attorney, Agent, or Firm* — Muncy, Geissler, Olds & Lowe, P.C.

(57) ABSTRACT

A monitoring device comprising a plurality of emitters and a plurality of receivers is provided. The emitters are capable of being driven to emit waves with directivity. The receivers are correspondingly disposed with respect to the emitters for receiving the waves. The transmitting paths of the waves define a monitoring area. The monitoring device is able to determine the moving trend and the location of the first object in the monitoring area when the specific waves are reflected to and received by the corresponding receivers.

16 Claims, 8 Drawing Sheets

(56) References Cited

U.S. PATENT DOCUMENTS

2013/0099922 A1* 4/2013 Lohbihler ............ G08B 13/184
340/539.17

* cited by examiner

MONITORING DEVICE

CROSS REFERENCE TO RELATED APPLICATION

This application claims the benefits of the Taiwan Patent Application Serial Number 104204808, filed on Mar. 31, 2015, the subject matter of which is incorporated herein by reference.

BACKGROUND OF THE INVENTION

1. Field of the Invention

The present invention relates to a monitoring device, and more particularly to a monitoring device for detecting location and moving trend of an object.

2. Description of Related Art

A conventional bed exit alarm has only one set of infrared module disposed in the path taken by a patient to leave the bed. Accordingly, when the infrared is interrupted and reflected by the patient leaving the bed, the alarm would be triggered to generate warning signal. However, medical personnel or family members may get into the path, too. It is difficult for the conventional bed exit alarm to distinguish, and thus false alarms occur frequently.

As for another type of conventional bed exit alarm, multiple sets of infrared modules may be disposed in an inner region and an outer region of a monitored field. For instance, the monitoring system disclosed in the Patent Application No. WO 2009/029996 A1 can recognize medical personnel or a family member approaching the bed by the breakage of the outer region of the monitored field prior to the breakage of the inner region of the monitored field.

The present invention provides a novel monitoring device capable of accurately detecting movement in the monitoring area and identifying the object as a patient or medical personnel.

SUMMARY OF THE INVENTION

A primary objective of the present invention is to provide a monitoring device that includes multiple sets of emitters and receivers, by which location and further moving trend of a first object within a monitoring area can be precisely determined when waves emitted from the emitters are blocked and reflected in the monitoring area by the first object.

Another objective of the present invention is to provide a monitoring device that can generate a warning signal when moving trend of a first object exceeds a predetermined threshold. Further, for the monitoring device of the present invention, the information, such as the location and moving trend of the first object and transmission of the warning signal, can be recorded in conjunction with a time trace for exploration in the future.

Yet another objective of the present invention is to provide a monitoring device in which waves can be alternately transmitted within the monitoring area by rapidly driving emitters by turns. By the quantity change and/or the combination change of the receivers receiving the reflected waves, the monitoring device not only can precisely determine the moving trend and location change of the first object, but also has the advantage of power saving.

In accordance with the foregoing objectives, the present invention provides a monitoring device that includes M emitters and N receivers, therewith M and N being positive integers. The emitters are capable of being driven to emit waves with directivity. The receivers are disposed corresponding to the emitters and each used for receiving the waves emitted from the corresponding one of emitters. The transmitting paths of the waves define a monitoring area. When the waves are reflected by the first object within the monitoring area and received by the corresponding receivers, the moving trend of the first object with respect to the monitoring area can be determined by the quantity change of the receivers receiving the reflected waves. Further, the location of the first object within the monitoring area can also be detected by the combination type of the receivers receiving the reflected waves.

In one embodiment, the emitters are simultaneously driven to continuously transmit the waves within the monitoring area, and the monitoring device can detect the location of the first object at different times and determine the location change by the combination type and combination change of the receivers receiving the reflected waves.

In another embodiment, the emitters are driven alternately and in sequence with a time interval to alternately transmit the waves within the monitoring area, and the monitoring device can determine the location change of the first object at different periods by the combination change of the receivers receiving the reflected waves. Herein, the period is defined by multiplying the quantity of the emitters by the time interval.

The monitoring device can generate a warning signal when the moving trend of the first object is detected to exceed a predetermined threshold. Preferably, the monitoring device of the present invention can accurately detect the moving trend of the first object by the aforementioned quantity change and location change.

The monitoring device of the present invention can further optionally include a central processing unit, a power module, a data recording module, a speaker, an unlocking module, a display, a control button and a voltage regulator module to provide additional functions of data recording, warning sound broadcasting, security identification, status displaying, function setting and so forth, thereby being suitable for monitoring of specific areas.

The foregoing and other objects, advantages, and novel features of the invention will become more apparent from the following detailed description when taken in conjunction with the accompanying drawings.

DETAILED DESCRIPTION OF THE PREFERRED EMBODIMENT

Figure 1:
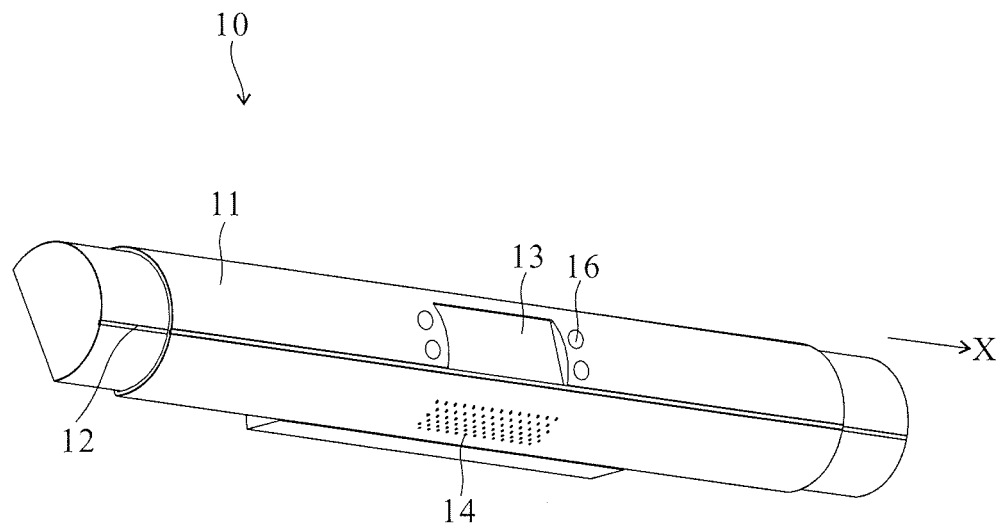
FIG. 1 is a perspective schematic view of a monitoring device at one angular orientation in accordance with the present invention.
Figure 2:
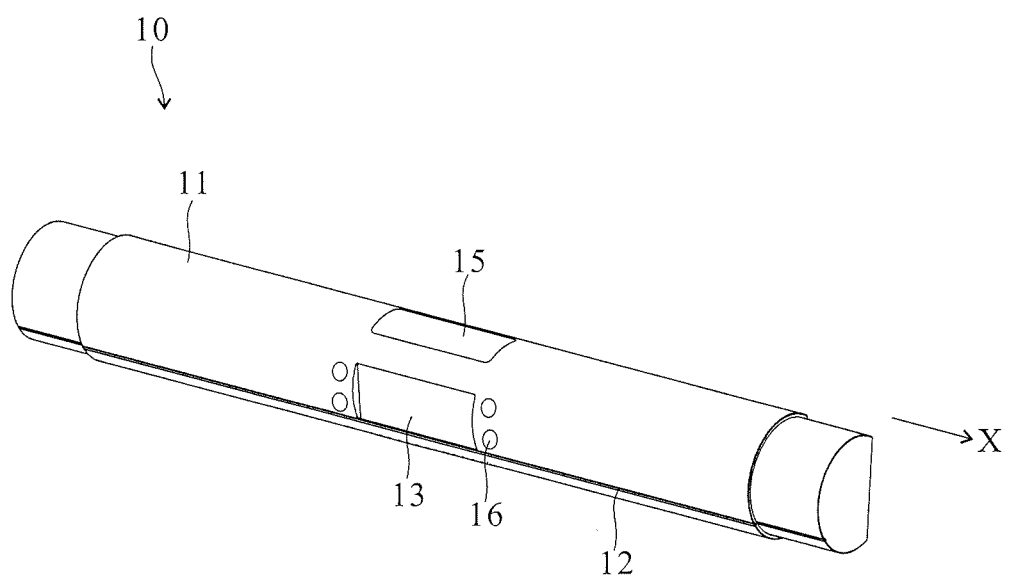
FIG. 2 is a perspective schematic view of a monitoring device at another angular orientation in accordance with the present invention.
Figure 3:
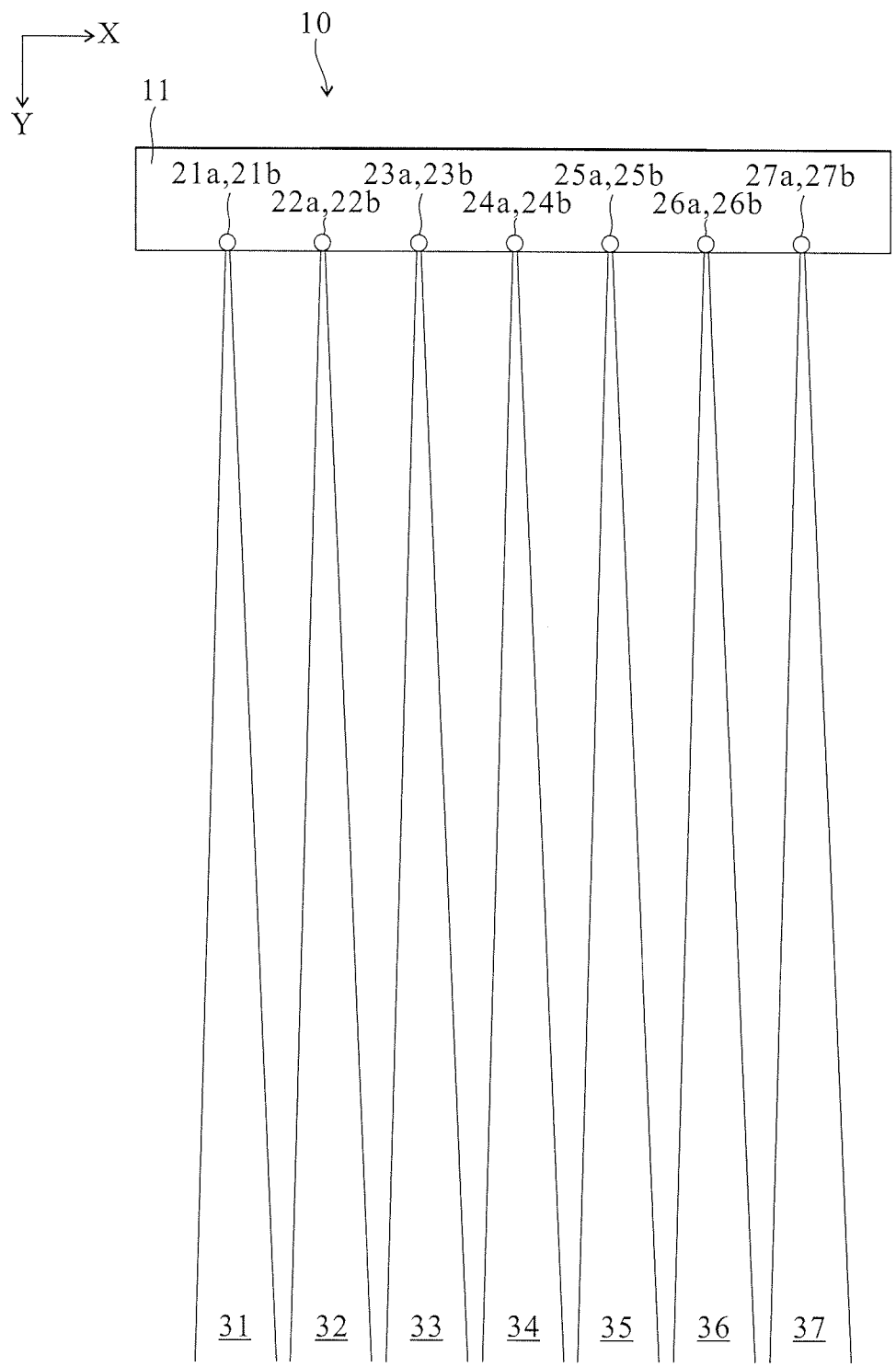
FIG. 3 is a schematic view showing a monitoring device emits waves within a monitoring area in accordance with the present invention.
Figure 4:
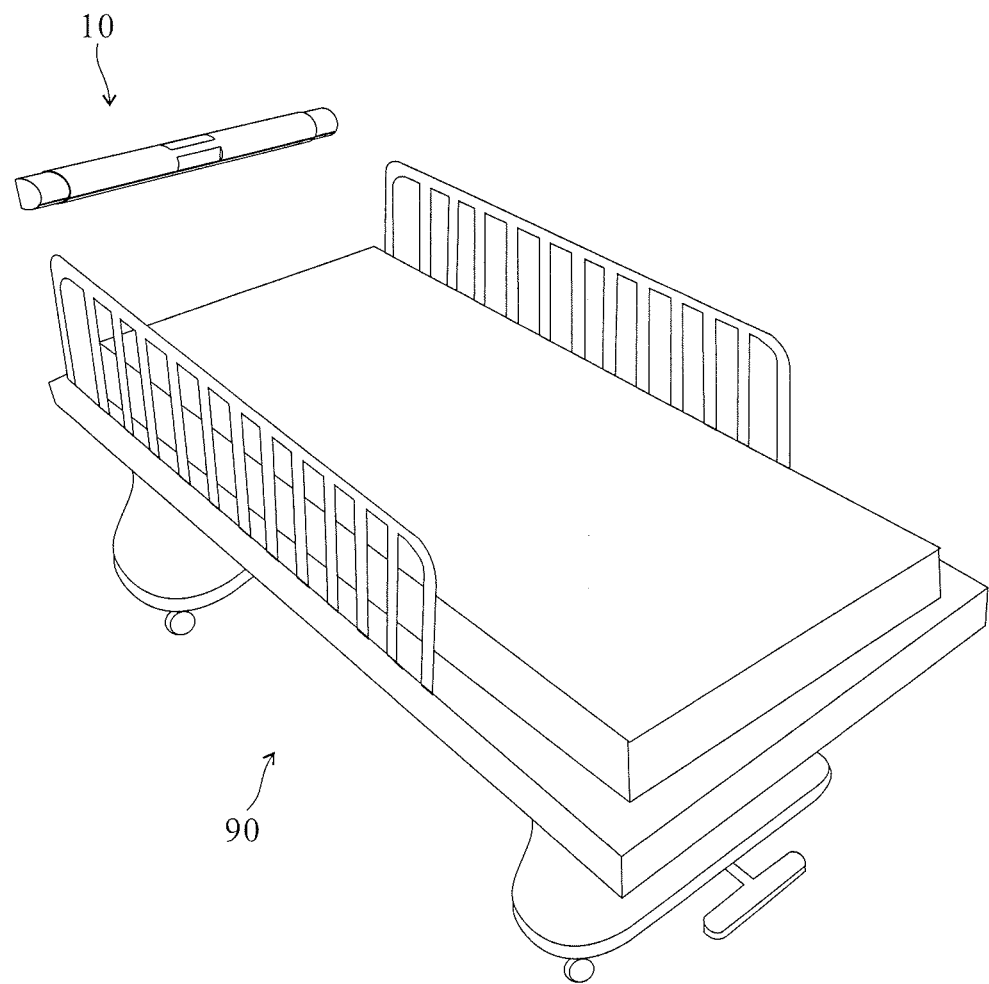
FIG. 4 is a schematic view showing a monitoring device is applied to a hospital bed in accordance with a preferred embodiment of the present invention.

Please refer to FIGS. 1 and 2, which are perspective schematic views of a monitoring device 10 at different angular orientations in accordance with the present invention. As shown in the figures, the monitoring device 10 includes a main body 11 provided with an opening 12 that extends along the first direction X. The monitoring device 10 further includes a plurality of emitters and receivers disposed in the interior of the main body 11. More specifically, the emitters are sequentially disposed in the opening 12, and the receivers also are disposed in the opening 12 and located corresponding to the emitters. As such, the emitters can be driven to emit waves outward. The waves can be ones with directivity, such as infrared waves or ultrasonic waves, and are transmitted substantially along the second direction Y perpendicular to the first direction X, as shown in FIG. 3. Further, by virtue of the opening 12, the receivers can receive the waves emitted from the corresponding emitters and reflected thereto.

The monitoring device 10 of the present invention includes M emitters and N receivers. M and N are positive integers, with M≥3 and M usually being equal to N. However, the quantities of the emitters and the receivers are not limited and not necessarily equal to each other, as long as the purpose of the present invention can be achieved.

FIG. 3 shows a preferred embodiment of the present invention. As shown in the figure, seven emitters 21*a*, 22*a*, 23*a*, 24*a*, 25*a*, 26*a*, 27*a* and seven corresponding receivers 21*b*, 22*b*, 23*b*, 24*b*, 25*b*, 26*b*, 27*b* are illustrated for detailed description. The emitters 21*a* to 27*a* can emit the waves 31, 32, 33, 34, 35, 36 and 37, respectively, and the waves 31 to 37 can be reflected to and received by the receivers 21*b* to 27*b*. For convenience of illustration, the emitter and the receiver of the same set are labelled at the same location, but in practical they may be spaced from and adjacent to each other. Herein, the waves 31 to 37 are infrared waves with directivity and transmitted along the second direction Y. The transmitting paths of the waves 31 to 37 can define a monitoring area.

For instance, the monitoring device 10 of the present invention can be disposed above a head end of a hospital bed. The monitoring device 10 is disposed at a predetermined height above one end of the hospital bed 90 to define a monitoring area essentially above the patient lying on the bed. The monitoring area has a width substantially equal to that of the hospital bed and a length not larger than that of the hospital bed. Accordingly, the patient is out of the monitoring area when lying down, and would enter the monitoring area when sitting up. Optionally, it is feasible to dispose the monitoring device 10 on a wall or on a bed frame.

Figure 5:
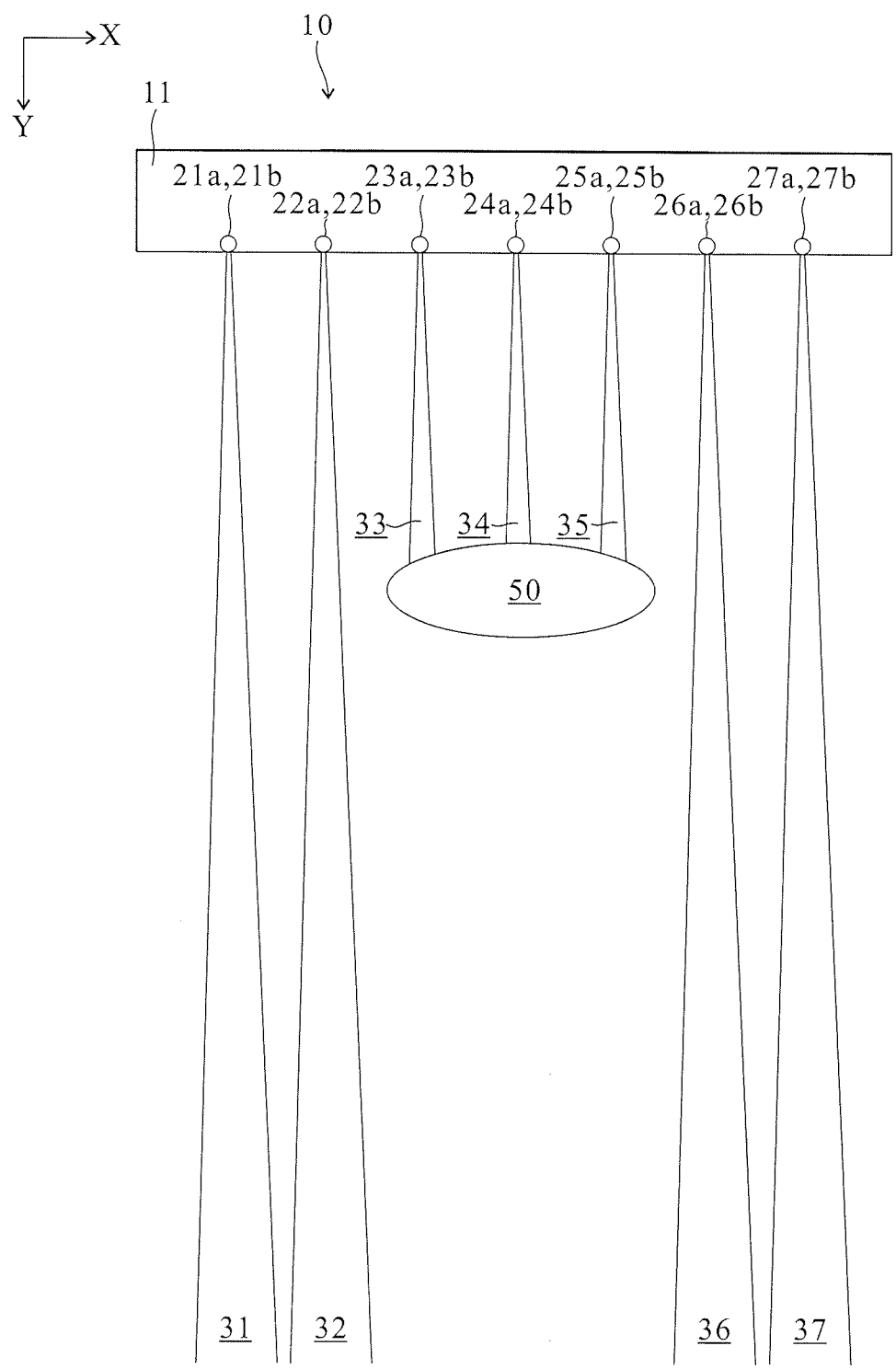
FIG. 5 is a schematic view showing a monitoring device detects location of a first object in accordance with the present invention.

Please further referring to FIG. 5, when a first object 50 (for example, a patient) is within the monitoring area, the waves 31 to 37 emitted from the emitters 21*a* to 27*a* would be partially reflected by the first object 50 and received by the corresponding ones of the receivers 21*b* to 27*b*. Accordingly, the monitoring device 10 can determine the location of the first object 50 within the monitoring area. As shown in FIG. 5, only the waves 33, 34 and 35 emitted from the emitters 23*a*, 24*a* and 25*a* are reflected by the first object 50 and then received by the receivers 23*b*, 24*b* and 25*b*, respectively, whereas other receivers 21*b*, 22*b*, 26*b* and 27*b* do not receive the waves 31, 32, 36 and 37 not reflected by the first object 50. As a result, the monitoring device 10 can determine the location of the first object 50, as illustrated in FIG. 5, being at the center of the monitoring area and corresponding to the emitters 23*a*, 24*a* and 25*a*.

Figure 6:
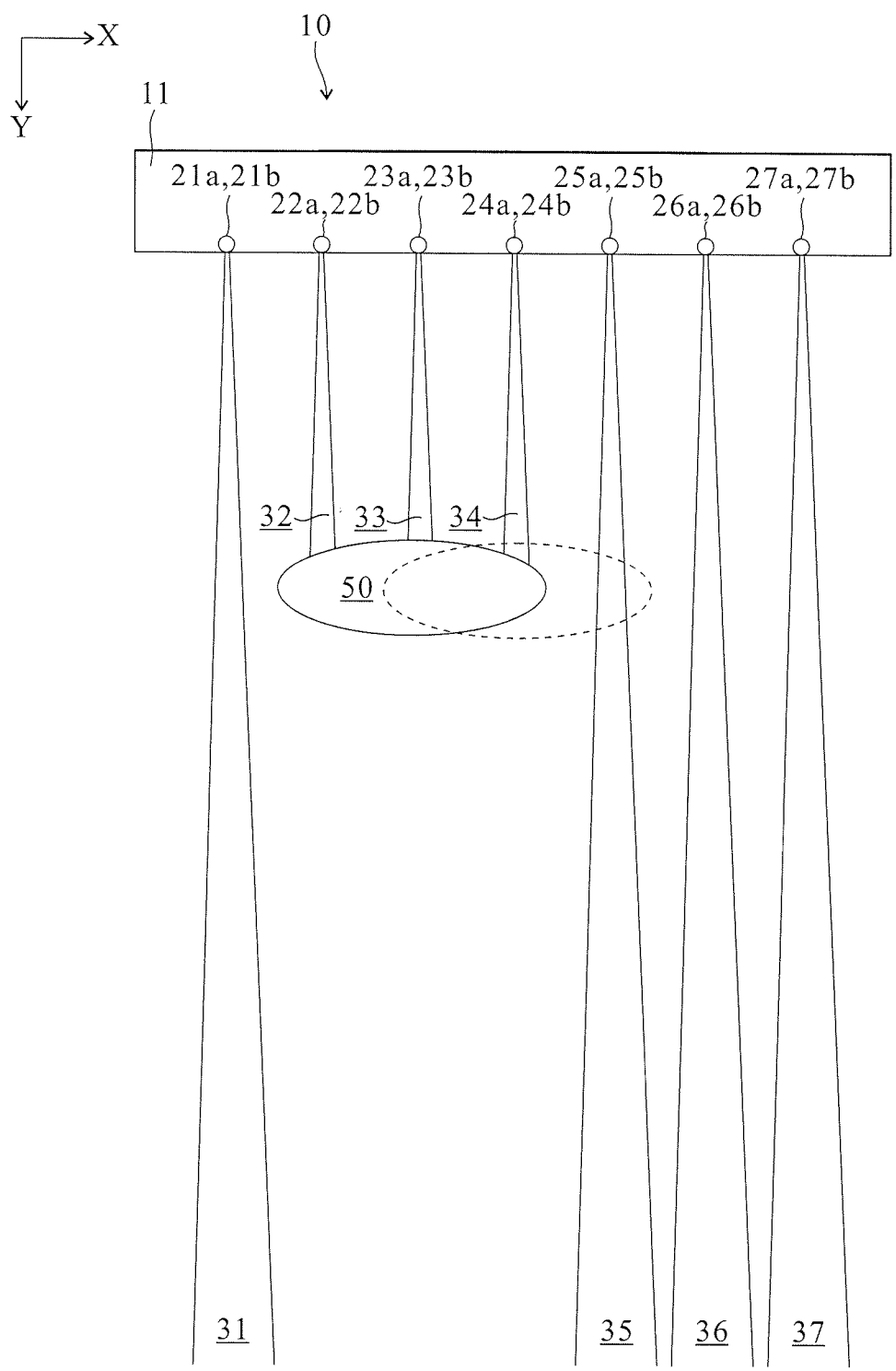
FIGS. 6 and 7 are schematic views showing a monitoring device detects movement of a first object in accordance with the present invention.

Next, please refer to FIG. 6 in which the original location, corresponding to FIG. 5, of the first object 50 is shown in a dashed line. When the first object 50 moves to the location shown by a solid line in FIG. 6, the waves 32, 33 and 34 emitted from the emitters 22*a*, 23*a* and 24*a* to the first object 50 would be reflected to and received by the receivers 22*b*, 23*b* and 24*b*, whereas other receivers 21*b*, 25*b*, 26*b* and 27*b* do not receive the waves 31, 35, 36 and 37 not reflected by the first object 50. Accordingly, the location of the first object 50 can be determined.

Figure 7:
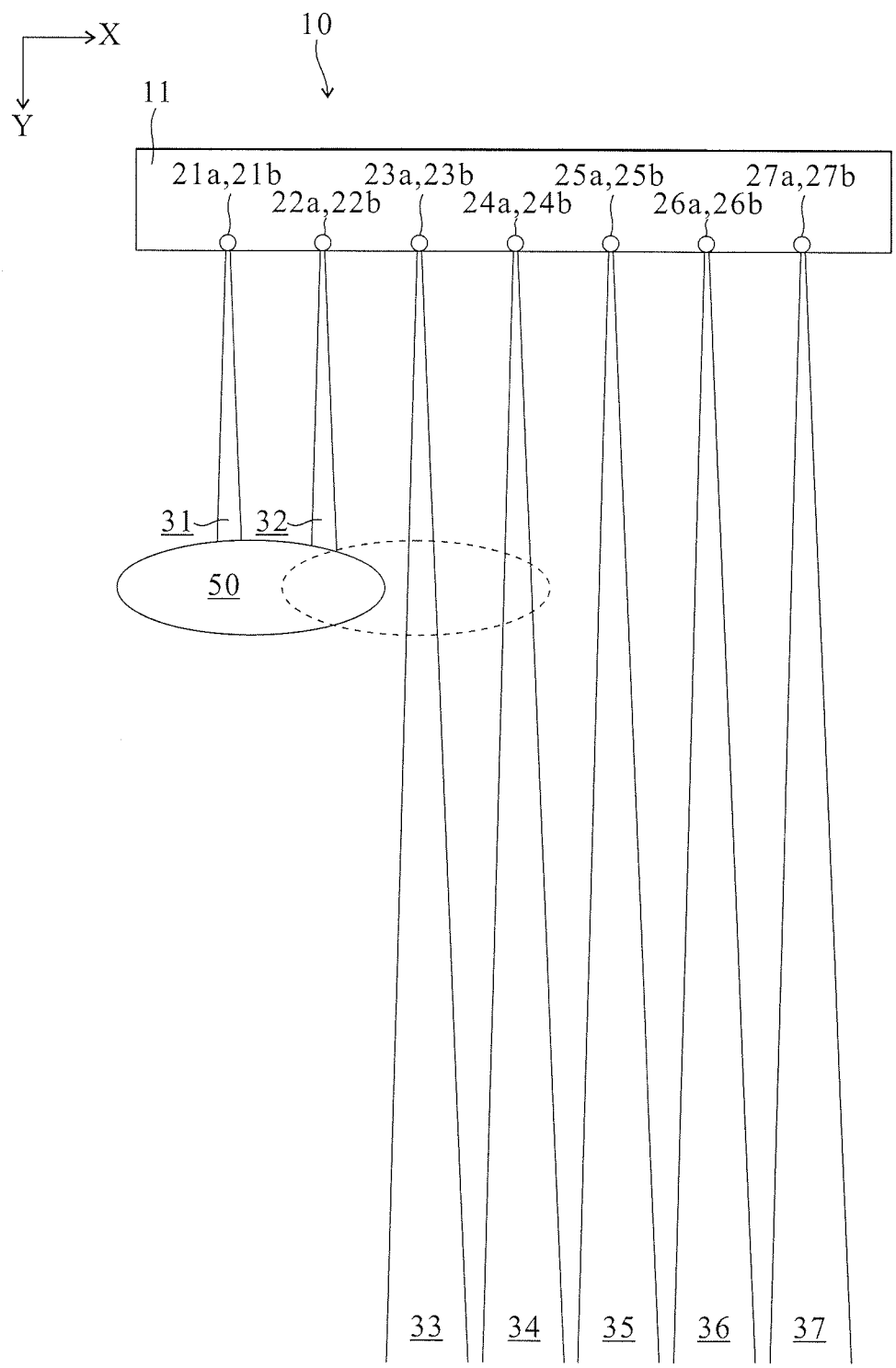

Further, FIG. 7 shows the first object 50 continuously moves toward the edge of the monitoring area from the locations shown in FIGS. 5 and 6. In this illustration, only the waves 31 and 32 emitted from the emitters 21*a* and 22*a* to the first object 50 would be reflected to and received by the receivers 21*b* and 22*b*, whereas other receivers 23*b*, 24*b*, 25*b*, 26*b* and 27*b* do not receive the waves 33, 34, 35, 36 and 37. More specifically, during the movement of the first object 50 from FIG. 5 to FIG. 7, the three receivers 23*b*, 24*b* and 25*b* would first detect the reflected waves, and the following receivers are the three receivers 22*b*, 23*b* and 24*b* and then the two receivers 21*b* and 22*b*. Obviously, when the first object 50 keeps moving along the same moving path, only one receiver 21*b* would detect the reflected wave 31, and finally no receiver can detect reflected waves (meaning that the first object 50 moves out of the monitoring area).

As mentioned above, the moving trend of the first object 50 with respect to the monitoring area can be ascertained by the quantity change of the receivers detecting the reflected waves. In other words, when the quantity of the receivers detecting the reflected waves gradually decreases (for example, the quantity decreases from 3 to 2, then to 1, and finally to 0), it can be recognized that the patient is leaving the hospital bed.

Under the medical procedure or caring behavior by the medical personnel (or the family member of the patient), none of the waves 31 to 37 emitted by the emitters 21*a* to 27*a* are reflected by the patient and then received by the receivers 21*b* to 27*b* when the patient is lying on the bed, but the medical personnel would cause the reflection of the waves 31 to 37. However, as the medical personnel enters the monitoring area from outside, the quantity of the receivers 21*b* to 27*b* detecting the reflected waves 31 to 37 would gradually increases from 0 to 3.

When fewer sets of emitters and receivers (e.g. only three sets) are installed, the location of the emitters and the receivers should be particularly adjusted to ensure that all the waves emitted from the three emitters can be directly reflected upon the patient's body up so as to achieve the above-mentioned gradually decreasing or increasing trend.

More preferably, the combination type of the receivers 21*b* to 27*b* receiving the reflected waves 31 to 37 can be further taken into consideration during the movement of the first object 50 to more precisely determine the movement mode. That is, the actual location of the first object 50 in the monitoring area can be further taken as the estimating parameters. For instance, when the receivers 21b, 22b and 23b receive reflected waves, it can be recognized that the first object 50 is located at one side of the bed. Similarly, the combination of the receivers 23b, 24b and 25b means that the first object 50 is at the center of the bed. Further, in the situation that the combination type and the quantity simultaneously change (for example, the combination changes from the three receivers 21b, 22b and 23b to the two receivers 21b and 22b, then to one receiver 21b, and finally to no receiver), it can be recognized that the patient is leaving the bed from the left side.

Additionally, if the receiver quantity increases from 0 directly (not gradually) to 3, or decreases from 3 directly (not gradually) to 0, it can be recognized that the change is caused by sitting up or lying down of the patient on the hospital bed. Further, the behavior can be confirmed by the combination type of the receivers 21b to 27b to identify the location of the first object 50. For instance, when the three receivers 23b, 24b and 25b at the center of the monitoring area receive the waves 33, 34 and 35, it can be recognized that the signal is induced by sitting up or lying down of the patient on the hospital bed.

Preferably, the emitters 21a to 27a of the present embodiment are driven alternately and in sequence so as to save electrical power and to alternately transmit the waves 31 to 37 in the monitoring area. In this aspect, the receivers 21b to 27b are alternately driven and shut off synchronously with the corresponding emitters 21a to 27a. By virtue of the quantity change and/or the combination change of the receivers 21b to 27b receiving the waves 31 to 37, the monitoring device 10 can determine the moving trend of the first object 50 with respect to the monitoring area or the actual location of the first object 50 within the monitoring area.

For instance, the emitters 21a to 27a can be driven alternately and in sequence with a time interval T. For example, if the time interval T is 1 millisecond (ms), the emitter 21a will be driven for one millisecond (ms) and shut off. Next, the emitter 22a will be driven for one millisecond (ms) and shut off. And next, the emitter 23a will take over and so forth. Accordingly, the waves 31 to 37 are emitted in a switching frequency of 1000 Hz. When the time interval is small enough, it is substantially equivalent to the mode that all emitters 21a to 27a are simultaneously driven.

In the aspect of only one emitter emitting waves at a time, the receivers 21b to 27b of the monitoring device 10 can be alternately driven synchronously with the corresponding emitters or all in functional state. However, in consideration of saving electricity, it is preferable to alternately drive the receivers synchronously with the corresponding emitters.

When the emitters 21a to 27a are driven alternately and in sequence with a time interval T, the quantity of the receivers receiving the reflected waves is calculated once per turn. In other words, it is necessary to set a period. The period can be obtained by multiplying the quantity M of the emitters 21a to 27a (M being 7 in this embodiment) by the time interval T. Accordingly, the monitoring device 10 can detect whether the first object 50 (such as a patient) is leaving the monitoring area by comparing the quantity change of the receivers receiving the waves reflected by the first object 50 at different periods. Further, the combination type and the combination change of the receivers can be taken to precisely determine the moving trend of the first object 50.

When the moving trend of the first object 50 exceeds a predetermined threshold, the monitoring device 10 would generate a warning signal. For instance, as shown in FIGS. 5 to 7, the first object 50 continuously moves toward the same direction, the receiver quantity is 3 in FIG. 5, 3 in FIG. 6 and 2 in FIG. 7. Obviously, if the first object 50 keeps moving, the receiver quantity will reduce to 1 and finally to 0 (meaning that the first object 50 moves out of the monitoring area). In this case, if the predetermined threshold is set to that only two receivers 21b and 22b receive the waves 31 and 32 reflected by the first object 50, as shown in FIG. 7, a warning signal would be generated when the monitoring device 10 detects the decreasing trend from 3 to 2 (even gradually to 0) of the receiver quantity and the combination of the receivers 21b and 22b, meeting the predetermined threshold. The predetermined threshold can be set according to requirement and not be limited. For instance, it is also feasible to set the moving trend and the predetermined threshold to that the quantity of the receivers sensing the reflected waves gradually decreases from 3 to 1 (being the receiver 21b at the edge of the monitoring area). Herein, the warning signal may be an indication sound, an external message or the combination of the above-mentioned signal types. Further, the indication sound can be preset synthetic sound or audio recorded by users.

Figure 8:
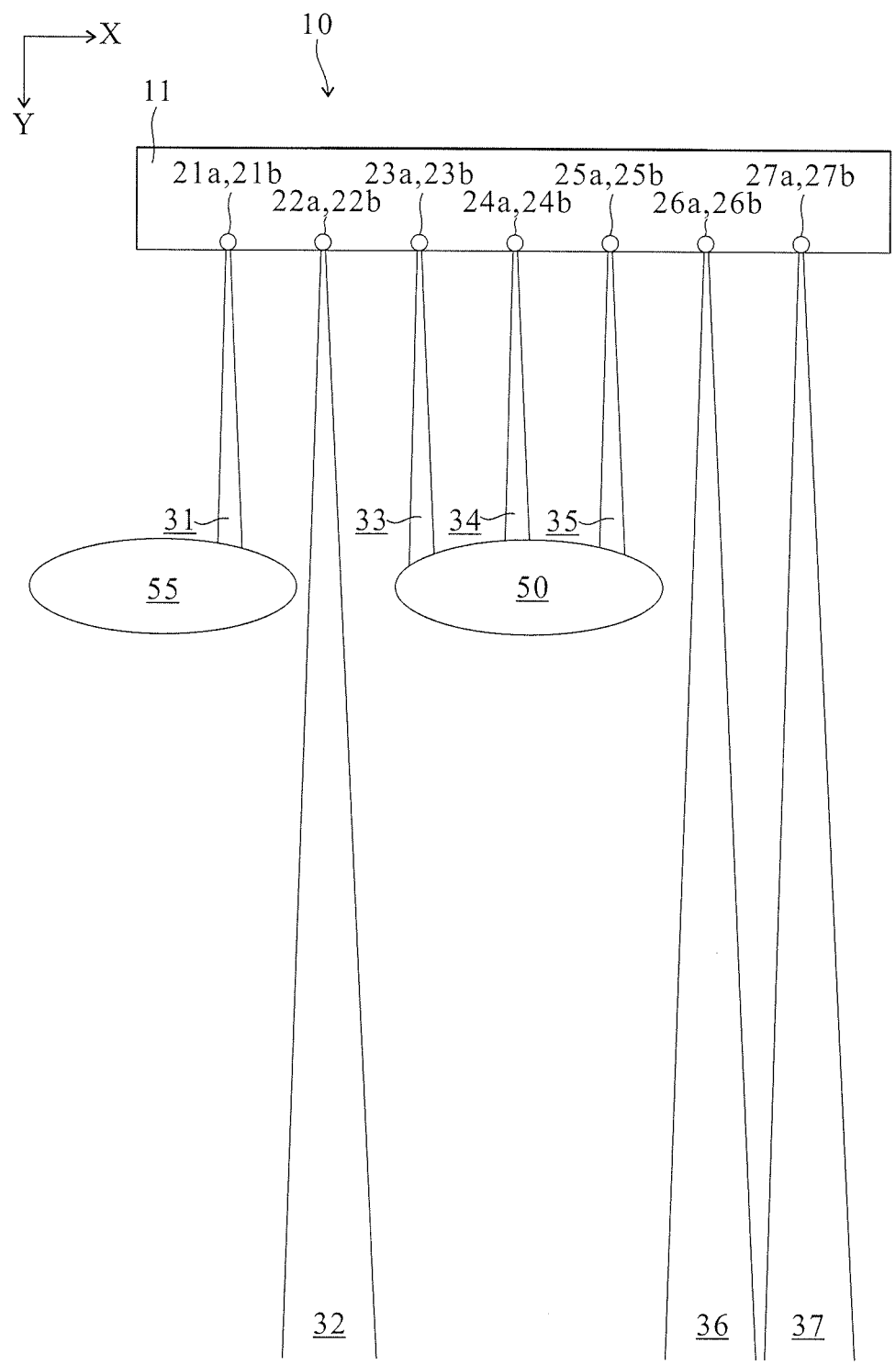
FIG. 8 is a schematic view showing a monitoring device detects a first object and a second object in accordance with the present invention.

Additionally, the monitoring device 10 of the present invention also may be applied in more complex situation. Please refer to FIG. 8 for further explanation of the above-mentioned aspect in which seven sets of emitters 21a to 27a and receivers 21b to 27b are illustrated. When the first object 50 is located within the monitoring area, the waves 33, 34 and 35 emitted from the emitters 23a, 24a and 25a would be reflected by the first object 50 and then received by the receivers 23b, 24b and 25b. Accordingly, the monitoring device 10 can detect the location of the first object 50. In the meanwhile, if the second object 55 (such as medical personnel) enters the monitoring area from outside, as shown in the figure, the wave 31 from the emitter 21a is also reflected by the second object 55 and received by the receiver 21b. As a result, the quantity of the receivers receiving the reflected waves is four, with the receiver combination of 21b, 23b, 24b and 25b, but the receiver 22b does not receive any reflected wave. The receiver quantity and receiver combination suggest two objects within the monitoring area. In other words, the locations and moving trends of multiple objects within the monitoring area can be detected by the quantity of the receivers 21b to 27b receiving the reflected waves 31 to 37 and the change in the receiver combination.

As for another situation of the second object 55 leaving the monitoring area (back to the status shown in FIG. 5), the receiver 21b cannot detect any reflected wave 31 from the emitter 21a. However, as the quantity of the receivers sensing the reflected decreases from 4 to 3 without further change (not meeting the predetermined threshold), no warning signal is generated. In other words, the situation within the monitoring area can be precisely monitored by setting the predetermined threshold, thereby significantly reducing erroneous judgment.

Additionally, when the waves 31 to 37 are infrared rays, extraneous sunlight, fluorescent lamps or other infrared devices may interfere with the detection, and mutual interference of the waves 31 to 37 also may occur. Thereby, the waves 31 to 37 emitted from the emitters 21a to 27a preferably have different encodings so as to efficiently avoid the aforementioned interference. More specifically, it may be practiced in that the waves 31 to 37 have different certain frequencies and can be decoded and recognized upon being received by the receivers 21b to 27b.

Figure 9:
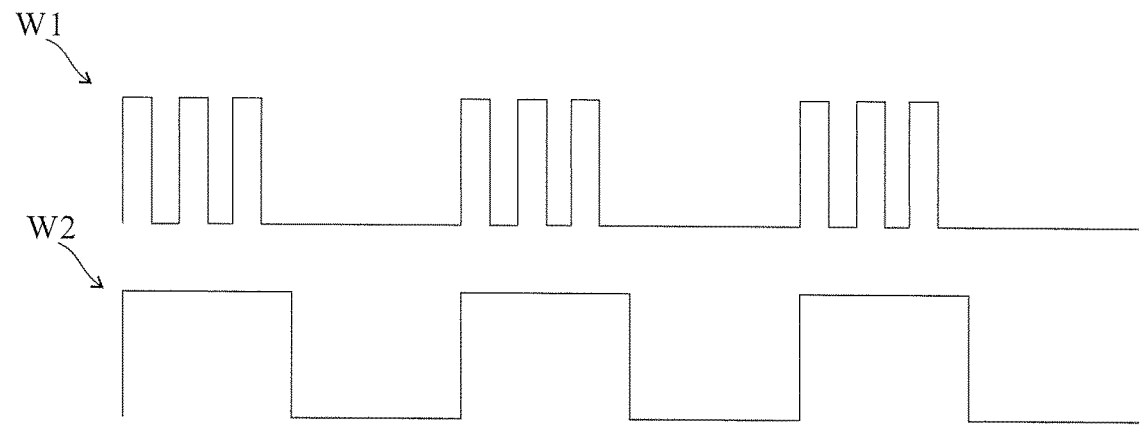
FIG. 9 is a schematic view of encoding waves of a monitoring device in accordance with the present invention.

Please further refer to FIG. 9 for detailed description of encoding and decoding of the waves 31 to 37. The following description of infrared (IR) rays is provided by way of example. For commercial infrared units, infrared rays typically are emitted in a frequency of 38000 Hz. That is, the infrared unit would automatically start IR emission per $1/79000$ second and stop IR emission per $1/79000$ second in a cyclic manner. The wave in the given period is defined as the reference wave W1. Since all the infrared units have the same reference wave W1 and cannot be distinguished from each other, an encoding wave W2 is required. FIG. 9 shows one type of encoding wave in a partial view for exemplary explanation, in which the encoding wave W2 is provided in a cyclic manner of switching on the IR unit for $3/38000$ second to emit the reference wave W1 of three periods and switching off the IR unit for $3/38000$ second to stop emission for three periods of the reference wave W1. For another emitter, another encoding wave W2 can be provided in another cyclic manner of switching on the IR unit for $5/38000$ second to emit the reference wave W1 of five periods and switching off the IR unit for $5/38000$ second to stop emission for five periods of the reference wave W1. Accordingly, when all emitters have different encoding waves W2 (namely, the reference wave W1 being provided in different periods), the waves can be distinguished from each other.

It can be understood that the reference wave W1 and the encoding wave W2 shown in FIG. 9 are provided only for illustration of encoding, and the present invention is not limited to the illustrated period and wave form. It is further noted that the period of the encoding wave W2 must be an integral multiple of the period of the reference wave W1 to ensure the integrity of the encoding wave W2 and to avoid the false judgment from the receivers 24b to 27b. In practical operation, the reference wave W1 should be emitted adequately in a time interval T to constitute multiple complete encoding waves W2. Preferably, the time interval T is an integral multiple of the period of the encoding wave W2 to ensure the integrity of the encoding wave W2 provided in the time interval T. When the receivers 21b to 27b are switched on and sense the reflected waves 31 to 37, the waves can be easily decoded to determine which one of the waves 31 to 37 from the emitters 21a to 27a is reflected by identifying the encoding wave W2 in the time interval T.

By the aforementioned design, the waves can be well distinguished even if all emitters 21a to 27a and receivers 21b to 27b are simultaneously driven (namely, all in functional state). For instance, when the wave 32 from the emitter 22a is reflected by the first object 50, the wave 32 may not be completely reflected to the receiver 22b and thus the receivers 21b and 23b also may receive the reflected wave 32. However, as the wave 32 from the emitter 22a have a unique encoding wave W2, the receivers 21b and 23b can identify and exclude the wave 32 by decoding process to avoid erroneous judgment. Similarly, when there are other electronic devices emitting infrared waves in the monitoring area, the undesired signal can be excluded by the same manner.

Moreover, when the receivers are alternately driven and shut off synchronously with the corresponding emitters, the erroneous receiving or judgment also can be avoided due to that only the corresponding receiver 22b is synchronously driven with other receivers being off when the emitter 22a is switched on.

Figure 10:
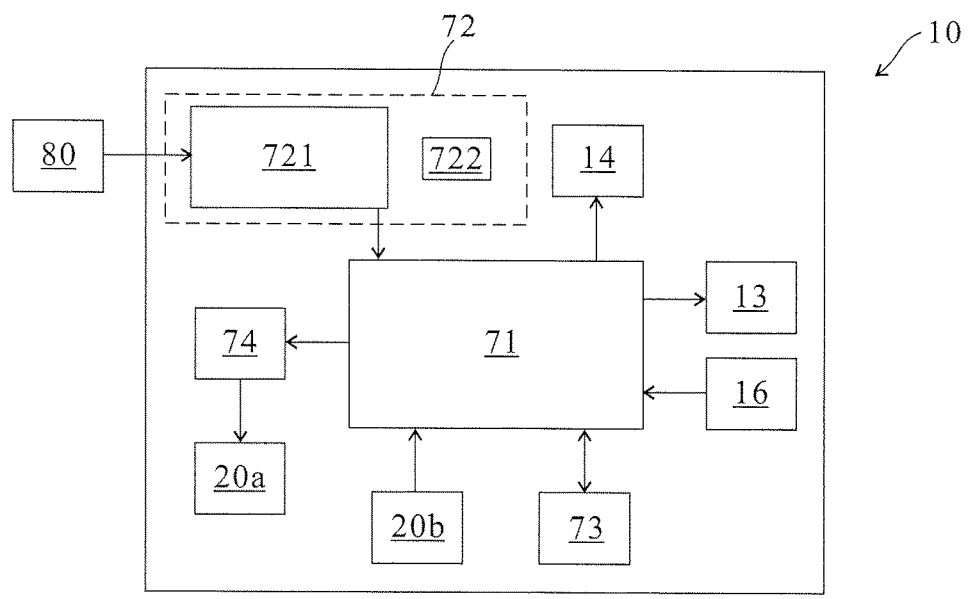
FIG. 10 is a block diagram showing connection between elements of a monitoring device in accordance with the present invention.

In accordance with the aforementioned examples, the monitoring device 10 of the present invention can further include other elements to provide more functions. Please referring to FIG. 10 in conjunction with FIGS. 1 and 2, the monitoring device 10 may further include a display 13, a speaker 14, an unlocking module 15 and at least one control button 16 disposed on the outer surface of the main body 11. The display 13 can present the operation status of the monitoring device 10, such as switching on or off, current time and so on. The control button 16 can be operated in conjunction with the display 13 to allow a user to select desired functions, to set time or the predetermined threshold mentioned above and so on. The speaker 14 can emit an indication sound or broadcast prerecorded voice. The unlocking module 15 is provided for security purpose and preferably includes a radio frequency identification (RFID) interface for user identification so as to ensure the operation of the monitoring device 10 to be performed by authorized users. For instance, the user can prohibit or interrupt the transmission of warning signal or be granted authorization to operate the control button 16 to set desired function by a sensing device, such as key fob, for the RFID interface of the unlocking module 15.

Additionally, the monitoring device 10 can further include a central processing unit 71 (disposed on a circuit board), a power module 72 and a data recording module 73 in the interior of the main body 11. For convenience of illustration, the emitters 21a to 27a disclosed above are collectively termed as an emitting module 20a, and the receivers 21b to 27b are collectively termed as a receiving module 20b. Preferably, the power module 72 includes a rechargeable battery 721 (such as a lithium battery) and a long life battery 72 (such as a mercury battery). The rechargeable battery 721 is used to supply the emitters 21a to 27a of the emitting module 20a, the receivers 21b to 27b of the receiving module 20b, the circuit board, the central processing unit 71, the speaker 14, the data recording module 73, the unlocking module 15 and the display 13 with necessary electricity of stable voltage. As shown in FIG. 7, the rechargeable battery 721 is connected with an external power supply 80. Accordingly, even if the external power supply 80 is disabled, the rechargeable battery 721 can support the monitoring device 10 to work over a period of time. The long life battery 722 is independently disposed on the circuit board and supports the function of keeping track of time. The data recording module 73 can be used to record all information within the monitoring area, and more importantly, to record the reason and time of generating warning signal. Accordingly, if an understanding of the situation in a certain period of time is required in the future, accurate data can be provided for the exploration.

Moreover, the monitoring device 10 of the present invention may further include a voltage regulator module 74 disposed on the circuit board. The voltage regulator module 74 can adjust the power supply voltage of the rechargeable battery 721 to the emitters 21a to 27a of the emitting module 20a. In response to the voltage scaling, the transmitting paths of the waves 31 to 37 from the emitters 21a to 27a may be modified so as to adjust the size of the monitoring area. For instance, in practical application, if the emitting distance of IR waves is shortened to about 1 meter by lowering the voltage, it can be applied in the monitoring of a baby bed.

Further, the monitoring device 10 of the present invention also can be combined with an emergency call bell originally disposed in the hospital ward. In details, the circuit of the emergency call bell can be connected to the monitoring device 10 of the present invention to achieve bidirectional driving function. As a result, in addition to the hand-operated emergency call bell, the monitoring device 10 of the present invention may be set to notify the nursing station when a warning signal is generated.

In conclusion, the monitoring device of the present invention can precisely detect the moving trend of the first object in the monitoring area. Upon the trend exceeds the predetermined threshold, a warning signal can be immediately generated. Additionally, the monitoring device can further include additional functions, such as unlocking, function setting, data recording and so on, and thus is suitable for the monitoring of specific areas.

The above examples are intended for illustrating the embodiments of the subject invention and the technical features thereof, but not for restricting the scope of protection of the subject invention. Many other possible modifications and variations can be made without departing from the spirit and scope of the invention as hereinafter claimed. The scope of the subject invention is based on the claims as appended.

What is claimed is:

1. A monitoring device for monitoring a first object, comprising:
    M emitters, wherein M is a positive integer, and the emitters are capable of being driven to emit waves with directivity; and
    N receivers, wherein N is a positive integer, and the receivers are disposed corresponding to the emitters and each used for receiving the wave emitted from the corresponding one of the emitters;
    wherein transmitting paths of the waves define a monitoring area, and when the waves are reflected by the first object within the monitoring area and received by the corresponding receivers, a moving trend of the first object with respect to the monitoring area is determined by a quantity change of the receivers receiving the reflected waves, and
    wherein the moving trend of the first object is determined as a leaving trend from the monitoring area when the quantity change of the receivers receiving the reflected waves is in a gradually decreasing trend of consecutive integers.

2. The monitoring device of claim 1, wherein a combination change of the receivers receiving the reflected waves is further taken to determine the moving trend.

3. The monitoring device of claim 2, wherein the emitters are simultaneously driven to continuously transmit the waves within the monitoring area.

4. The monitoring device of claim 2, wherein the emitters are driven alternately and in sequence and the receivers are driven and shut off synchronously with the corresponding emitters to alternately transmit the waves within the monitoring area.

5. The monitoring device of claim 4, wherein the emitters are driven alternately and in sequence with a time interval, a period is defined by multiplying the quantity of the emitters by the time interval, the monitoring device is capable of determining a location change of the first object at different periods by comparing the combination change of the receivers receiving the reflected waves, and the moving trend is determined by the quantity change and the location change.

6. The monitoring device of claim 5, wherein the time interval is 1 ms, and the emitters are driven with a switching frequency of 1000 Hz.

7. The monitoring device of claim 1, wherein the monitoring device generates a warning signal when the moving trend of the first object exceeds a predetermined threshold.

8. The monitoring device of claim 1, wherein the waves emitted from the emitters have different encodings, and are decoded when being received by the receivers.

9. The monitoring device of claim 8, wherein the waves respectively consist of multiple continuous encoding waves, each of which is defined by multiple reference waves in a specific amount to make the encoding waves of the different waves distinguishable from each other.

10. The monitoring device of claim 1, further comprising a circuit board with a central processing unit, a power module, a data recording module, a speaker, an unlocking module, a display, and at least one control button, wherein the circuit board, the power module and the data recording module are disposed in a main body, and the speaker, the unlocking module, the display and the control button are disposed on an outer surface of the main body.

11. The monitoring device of claim 10, wherein the monitoring device generates a warning signal and the data recording module records the warning signal and corresponding time thereof when the moving trend of the first object exceeds a predetermined threshold, and the warning signal is selected from the group consisting of an indication sound, an external message and the combination thereof, therewith the indication sound being emitted by the speaker.

12. The monitoring device of claim 11, wherein the unlocking module comprises a radio frequency identification interface, by which the warning signal can be cancelled or the operation of the control button can be allowed.

13. The monitoring device of claim 1, wherein the waves are infrared waves or ultrasonic waves.

14. The monitoring device of claim 1, wherein M and N are positive integers of 3 or more.

15. The monitoring device of claim 1, further comprising a main body provided with an opening that extends along a first direction, wherein the emitters are sequentially disposed in the opening to emit the waves outward from the opening, and the receivers are disposed in the opening and located corresponding to the emitters, and further, by the opening, the receivers are capable of receiving the waves emitted from the corresponding emitters and reflected thereto, therewith the waves being transmitted substantially along a second direction perpendicular to the first direction.

16. The monitoring device of claim 1, wherein no warning signal is generated when the quantity change of the receivers receiving the reflected waves is in a gradually increasing trend of consecutive integers.

* * * * *